US012717649B2

(12) United States Patent
Fahlbusch et al.

(10) Patent No.: US 12,717,649 B2
(45) Date of Patent: Aug. 25, 2026

(54) DYNAMICALLY ASSIGNING USER DEVICES TO WORKLOAD CLUSTERS

(71) Applicant: SAP SE, Walldorf (DE)

(72) Inventors: Jannick Stephan Fahlbusch, Berlin (DE); Florian Geckeler, Neustadt an der Weinstrasse (DE)

(73) Assignee: SAP SE, Walldorf (DE)

( * ) Notice: Subject to any disclaimer, the term of this patent is extended or adjusted under 35 U.S.C. 154(b) by 392 days.

(21) Appl. No.: 18/389,037

(22) Filed: Nov. 13, 2023

(65) Prior Publication Data

US 2025/0156242 A1 May 15, 2025

(51) Int. Cl.
*G06F 9/50* (2006.01)

(52) U.S. Cl.
CPC .................................. *G06F 9/5083* (2013.01)

(58) Field of Classification Search
CPC ........... G06F 9/5083; G06F 2209/5011; G06F 2209/5015; G06F 2209/5017; G06F 2209/505; G06F 2209/508; G06F 2209/509; G06F 9/505; G06F 9/5066; G06F 9/5027
USPC .......................................................... 718/104
See application file for complete search history.

(56) References Cited

U.S. PATENT DOCUMENTS 8,938,416 B1 * 1/2015 Cole .................. G06F 16/2255 707/747
10,447,806 B1 10/2019 Sahay et al.
11,627,095 B2 4/2023 Ananthanarayanan et al.
2003/0204273 A1 * 10/2003 Dinker .................... H04L 41/12 706/15
2004/0215614 A1 * 10/2004 Doyle ..................... G06F 9/526
2006/0179143 A1 * 8/2006 Walker .................. G06F 9/5072 709/226
2012/0096468 A1 * 4/2012 Chakravorty ............. G06F 9/50 718/103
2014/0130054 A1 * 5/2014 Molkov ................ G06F 9/5072 718/104
2017/0099352 A1 * 4/2017 Baughman .......... H04L 67/1021
2018/0157511 A1 * 6/2018 Krishnan .............. G06F 9/5088
2019/0042759 A1 * 2/2019 Smith ................... G06F 21/602
2019/0179673 A1 * 6/2019 Gray ....................... H04L 43/16
2020/0275313 A1 * 8/2020 He ........................ H04L 47/822

(Continued)

OTHER PUBLICATIONS

"European Application No. 24209358.1 Extended European Search Report mailed on Mar. 24, 2025", 11 pgs.

(Continued)

*Primary Examiner* — Adam Lee
(74) *Attorney, Agent, or Firm* — SCHWEGMAN LUNDBERG & WOESNNER, P.A.

(57) ABSTRACT

Systems and methods described herein relate to the assignment of user devices to workload clusters. Resource utilization on a plurality of user devices is monitored. A device agent on each user device may be used to monitor the resource utilization. A workload execution request identifies resource requirements of a cluster workload. The workload execution request is assigned to a cluster based on the resource requirements of the cluster workload and the resource utilization on the plurality of user devices. The cluster comprises the plurality of user devices. The workload execution request is caused to be executed on the cluster. Each user device executes user workloads and a respective portion of the cluster workload.

20 Claims, 7 Drawing Sheets

(56) References Cited

U.S. PATENT DOCUMENTS

| | | | | |
|---|---|---|---|---|
| 2021/0141923 | A1* | 5/2021 | Wu | G06F 21/6236 |
| 2022/0121928 | A1* | 4/2022 | Dong | G06N 3/04 |
| 2022/0129316 | A1* | 4/2022 | Sheoran | G06F 9/5011 |
| 2023/0008011 | A1* | 1/2023 | Nair | H04L 47/726 |
| 2023/0012487 | A1* | 1/2023 | Makaya | G06F 9/505 |
| 2023/0145437 | A1* | 5/2023 | Costa | G06F 9/4887 718/107 |
| 2023/0161633 | A1* | 5/2023 | Wang | G06F 9/5027 718/105 |
| 2023/0185682 | A1* | 6/2023 | Zhang | G06F 11/1484 714/4.11 |
| 2024/0184609 | A1* | 6/2024 | Malvankar | G06F 9/4881 |
| 2024/0195867 | A1* | 6/2024 | Bapst | H04L 67/1008 |
| 2024/0396804 | A1* | 11/2024 | Singwi | G06F 9/5077 |
| 2024/0414049 | A1* | 12/2024 | Vasanad | H04L 41/0806 |

OTHER PUBLICATIONS

Feng, Chuan, "Computation offloading in mobile edge computing networks A Survey", Journal of Network and Computer Applications 202, 2022, 16 pgs.

Luo, Quyuan, "Resource Scheduling in Edge Computing A Survey", IEEE Communications Surveys and Tutorials vol. 23 No. 4 Fourth Quarter 2021, 2021, 35 pgs.

"Autoscaling", Amazon EKS, [Online]. Retrieved from the Internet: <URL: https://docs.aws.amazon.com/eks/latest/userguide/autoscaling.html>, (Accessed Oct. 8, 2023), 1 pgs.

"How Screensavers Work", HowStuffWorks, [Online]. Retrieved from the Internet: <URL: https://computer.howstuffworks.com/screensaver1.htm>, (Accessed Oct. 15, 2023), 11 pgs.

* cited by examiner

DYNAMICALLY ASSIGNING USER DEVICES TO WORKLOAD CLUSTERS

TECHNICAL FIELD

The subject matter disclosed herein generally relates to distributed computing environments. More specifically, but not exclusively, the subject matter relates to the assignment of user devices to workload clusters in a distributed computing environment.

BACKGROUND

Many modern enterprises utilize distributed computing environments to meet their computing needs. For example, an enterprise involved in developing and providing software solutions may use workload clusters that include sets of cloud-based compute nodes to handle various workloads during application development, testing, and production.

Costs associated with provisioning, using, or maintaining dedicated cluster resources can be relatively high. At the same time, an enterprise may incur significant costs in providing workers with user devices, such as laptops or desktop computers. With many workloads being assigned to cloud-based cluster resources, local machines associated with the enterprise may have significant unused capacity. For example, workers in a software development team may offload various workloads to cloud-based resources while using their own user devices largely as terminals for accessing or communicating with those resources. This can result in suboptimal or inefficient usage of computing resources (e.g., processing, memory, or data storage resources) that are paid for by the enterprise.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

DETAILED DESCRIPTION

Figure 1:
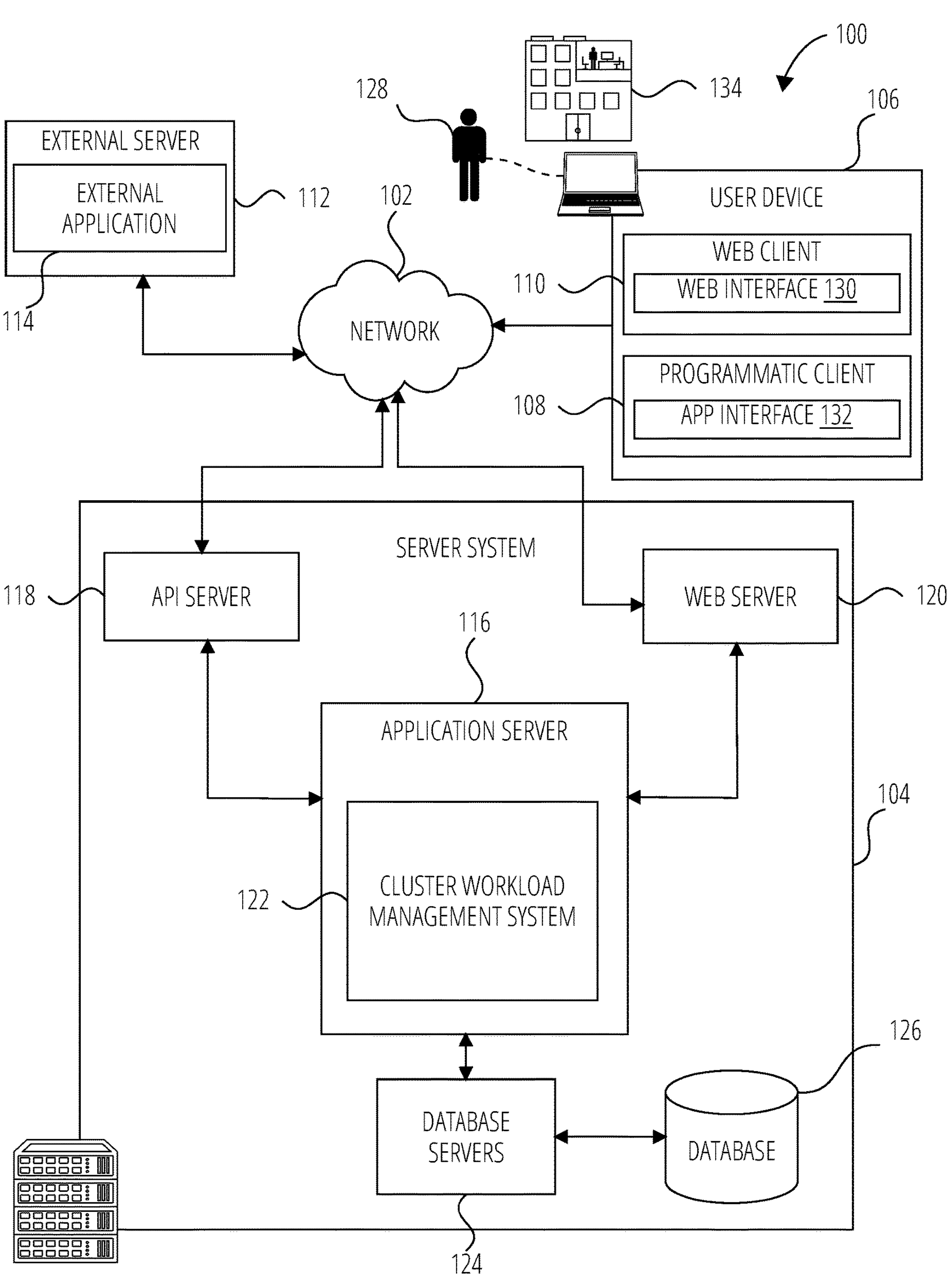
FIG. 1 is a diagrammatic representation of a network environment that includes a cluster workload management system, according to some examples.

An entity with access to a pool of user devices may possess significant latent computing capacity. Examples described herein may allow enterprises or other entities to leverage these available resources more fully or effectively, thereby reducing overall infrastructure costs or infrastructure footprints. In some examples, unused capacity on user devices is harnessed to form workload clusters in a dynamic and adaptable manner. Such unused capacity may be utilized alongside dedicated compute nodes to provide hybrid clusters.

As used herein in the context of computing workloads, the term "resources" refers to any compute assets that may be used or allocated to execute workloads. For example, resources such as Central Processing Unit (CPU) resources, Graphics Processing Unit (GPU) resources, memory, storage, network connectivity, or bandwidth may be utilized.

The terms "workload cluster" and "cluster" are used interchangeably in this disclosure. As used herein, a "cluster" refers to a group or set of (directly or indirectly) interconnected computing resources that work collectively to handle one or more workloads. The respective computing resources are commonly referred to as "nodes." The nodes in a cluster may be physical machines or virtual machines. The nodes can be viewed logically as a single unit with respect to execution of workloads assigned to the cluster. Cluster sizes can range from a few nodes to hundreds or thousands of nodes. Clusters may share workload processing and storage resources and may allow for parallel processing or high availability by distributing work across nodes.

In some examples, a method includes monitoring resource utilization on a plurality of user devices. For example, a pool of user devices may be monitored to track or evaluate their respective resource utilization. In some examples, one or more user devices are selected from the pool of user devices and assigned to a cluster based on resource utilization (e.g., detected resource availability), as is described in greater detail elsewhere. Clusters may be dynamically or temporarily created to handle cluster workloads.

As used herein, the term "user device" refers to a physical computing device that is capable of connecting to a network and that is directly operated by a user. For example, an enterprise may provide its workers with user devices, such as desktop computers or laptops, for use in performing their everyday work tasks, which may include general purpose tasks (e.g., using word processing or email applications) or more specialized tasks (e.g., performing software development, data analysis, or machine learning tasks). A user device is not a shared resource that is accessed remotely by multiple users for performing computational tasks, such as a server, or a thin client that relies on a server to perform its computational tasks. The term "user device" does not refer to dedicated infrastructure for a cluster environment, such as a dedicated compute node that serves the primary function of handling cluster workloads. A user device may be personalized for use by a specific user (e.g., the user device contains the user's files and settings, the user device has a user profile of the user stored thereon, or a user account of the user is associated with the user device).

This disclosure describes both "cluster workloads" and "user workloads." As used herein, the term "cluster workload" refers to a computing workload or task that is assigned to a cluster for execution. For example, the cluster workload may be assigned to the cluster by a scheduler or orchestration component and automatically distributed across nodes of the cluster for parallel processing. Cluster workloads may include, but are not limited to, high-performance computing tasks, simulations, analytics, batch processing jobs, or other resource-intensive operations. In some examples, cluster workloads may be general purpose operations and are thus not limited to specialized operations. A cluster workload may be triggered or requested, for example, by an end user or by a software developer who is working with (e.g., testing) an application in a cluster.

As used herein, the term "user workload" refers to a computing workload or task that is executed on a user device based on an instruction or selection made by its user. A user workload is not assigned to a cluster. For example, a user device may run various programs and applications to allow a user to browse the Internet, access emails, access cloud-based resources, use software installed on the user device to perform tasks, or view (e.g., stream) media. Accordingly, a user workload refers to a user-driven workload running on the hardware of a user device, while a cluster workload is assigned centrally to multiple nodes for execution. Examples described herein allow a user device to run both user workloads and cluster workloads.

In the context of this disclosure, a dedicated cluster node does not execute user workloads. For example, even though an administrator may be able to access a dedicated cluster node to execute diagnostics or configuration applications, such applications are not "user workloads" in the context of this disclosure. Further, an operating system, network drivers, or other system-level processes that may run on a cluster node are not regarded as "user workloads."

The resource utilization on a user device may be monitored to determine whether the user device has excess resources available to contribute to a cluster. For example, a device agent executing on a user device may determine resources that the user device can contribute to the cluster while executing one or more user workloads. The method may include causing the device agent to be installed on the user device to monitor resource utilization. In some examples, the method includes monitoring of the resource utilization on a plurality of user devices by receiving, from the device agent executing on each user device, an indication of the resources that the user device can contribute to the cluster.

A cluster may include a cluster agent. For example, a cluster agent executing on the cluster aggregates resource utilization data from nodes in the cluster, and a cluster controller receives, from the cluster agent, the aggregated resource utilization data (see, for example, FIG. 2 and FIG. 4, which are discussed in greater detail below). The cluster controller may be a processor-implemented component that is communicatively coupled to the cluster and to a plurality of other clusters in a distributed computing environment. The cluster controller may be responsible, for example, for evaluating resource utilization or availability, assigning workload execution requests to suitable clusters, performing scheduling, creating or adjusting (e.g., scaling) clusters, or transmitting task instructions.

A cluster may be dynamically created or configured. For example, user devices with excess or spare resources may be dynamically and temporarily assigned to a cluster for handling or assisting with a cluster workload. In some examples, a connection with the cluster is created by the cluster agent executing on the user device to allow the user device to offer available resources to the cluster.

In some examples, the method includes receiving or accessing a workload execution request that identifies resource requirements of a cluster workload. The workload execution request may be assigned to a cluster based on the resource requirements of the cluster workload and the resource utilization on the plurality of user devices. In some examples, the cluster is created in response to receiving the workload execution request. In other examples, the cluster is a previously created or preexisting cluster that is selected based on the resource requirements of the cluster workload and the resource utilization on the plurality of user devices.

The cluster includes one or more user devices. In some examples, the cluster includes one or more user devices and one or more dedicated compute nodes. In the context of a cluster, and as described above, a user device is distinct from a dedicated compute node. For example, while a user device can be assigned to a cluster such that unused capacity can be applied to executing workloads, the user device may still be operated by a user (e.g., to perform primary tasks for which the user device was provided to the user).

A dedicated compute node, on the other hand, may handle cluster workloads assigned to it by a processor-implemented cluster controller or processor-implemented scheduler component and is not directly operated by a user. In other words, a dedicated compute node may be a computing resource provisioned specifically within a cluster environment to provide processing capacity for cluster workloads, without any other primary function, while a user device may process user workloads and, where capacity permits, cluster workloads.

The method may include causing the workload execution request to be executed on the selected or assigned cluster. Where the cluster includes a plurality of user devices, both user workloads and a respective portion of the cluster workload execute on each of the plurality of user devices.

For example, a user device in the cluster may simultaneously (e.g., in parallel) execute one or more user workloads and a cluster workload. Accordingly, in some examples, a user device may execute a portion of a cluster workload even while the user device is not otherwise "idle" (e.g., while the user device is operating to run user applications as part of one or more user workloads), provided the user device is determined to have sufficient excess resources to contribute to the cluster. Where the cluster additionally includes one or more dedicated compute nodes, a respective portion of the cluster workload may execute on each dedicated compute node.

In some examples, a specific user device may be assigned to the cluster based on the user device meeting one or more cluster contribution criteria. The cluster contribution criteria may include predetermined requirements, conditions, or restrictions that are checked to determine whether the user device qualifies to be selected to (or to be eligible to) allocate a portion of its resources to execute a cluster workload. Examples of cluster contribution criteria may include resource availability (e.g., based on the resource utilization data of the user device), connectivity, geographic location, security protocols, or usage patterns. For example, the cluster contribution criteria may specify that a user device can be added to a cluster if its available CPU resources and available memory resources exceed predetermined thresholds. Cluster contribution criteria may also include user-defined criteria, such as user-specified constraints (e.g., the user device cannot be added to a cluster when running on battery power alone).

In some examples, the cluster controller transmits, to a user device that is part of a cluster (e.g., to a device agent executing on the user device), an instruction to allocate a first portion of resources on the user device to the cluster. For example, a portion of the CPU and memory resources of the user device may be allocated to the cluster for assisting with the cluster workload, while a second portion of the resources on the user device is used to execute user workloads.

In some examples, the user device has a cluster environment in which the cluster workload is executed or handled. The cluster environment may be separated from a user environment on the user device in which user workloads execute.

In some examples, a cluster environment provides an isolated runtime space that is configured on a user device to execute cluster workloads, while the user environment is the standard runtime space (or spaces) configured on the user device for user workloads. The cluster environment may separate the cluster-specific tasks from a standard user environment. Examples of cluster environments may include one or multiple virtual machines, containers, sandboxes, or other dedicated or isolated runtime environments. Resources such as CPU, memory, and storage may be allocated to the cluster environment.

The resources allocated to the cluster environment may thus be capped or limited to ensure that cluster workloads can run without significantly impacting user experience. Resources not allocated to the separate cluster environment may remain available for the user environment and applications or tasks that are unrelated to the cluster.

The method may include transmitting a message to a user device to indicate that the user device has been assigned to the cluster. For example, the cluster controller may notify the device agent that the user device has been selected to operate as part of a particular cluster, after which the user device automatically contributes some of its resources to the cluster.

Techniques or architectures described herein may be used in various applications. For example, a software organization can utilize cluster deployments to facilitate development and testing of features and services. This may be referred to as cluster application development.

While provisioning separate clusters for each software developer (or developer team) can provide sufficient resources and prevent interference, it can also lead to high infrastructure costs in cluster application development. At the same time, the organization may have access to a pool of user devices, such as the user devices of the respective software developers. A user device of a software developer may be a relatively powerful machine (e.g., compared to the machines of some co-workers) with significant latent resources if not utilized efficiently. Techniques described herein may be used to run clusters at least partially across local machines (e.g., user devices of software developers) to utilize resources more efficiently.

A device agent may be installed on each user device. The device agents may monitor and continuously report resource utilization data (e.g., for a specific user device, the device agent may indicate how much storage space, idle memory, or idle CPU resources the user device has available). The resource utilization data may be fed into a cluster agent and aggregated on a per-cluster basis. A cluster controller may determine, based on the resource utilization data, that one or more specific user devices, or a specific cluster that includes user devices, has spare capacity to run (or assist with) a cluster workload. In some examples, the method may include generating resource utilization predictions based on historic data to determine whether a user device can be added to a cluster.

Using available resources of user devices for handling cluster workloads may unlock latent or overlooked resources and reduce cloud infrastructure requirements (e.g., rental fees). In some examples, both local devices and cloud resources may be used in the same cluster to define a hybrid cluster. Cluster workloads may thus be distributed across both cloud and local devices to enhance cluster efficiency at lower expense. As mentioned above, local machines may be leveraged in an intelligent manner without significantly or notably affecting the on-device experience of a user.

Examples described herein may address or alleviate the technical problem of providing adequate computing resources for software development, testing, or other computing operations, without underutilizing or wasting local resources. This technical problem may be addressed or alleviated by monitoring resource utilization across user devices in real-time and assigning workload requests to clusters comprising those user devices based on their available resources. This allows leveraging unused user device capacity, for example, to supplement dedicated cluster infrastructure. As a result, local machines may be better utilized (e.g., less idle CPU or memory resources across an enterprise) while cloud costs are simultaneously reduced.

Examples described herein may also address or alleviate the technical problem of assigning cluster workloads to suitable clusters. This technical problem may be addressed or alleviated by monitoring resource utilization on user devices and incorporating them into clusters, optionally together with dedicated compute nodes. This may enable workloads to be dynamically assigned to and executed on heterogeneous clusters, such as clusters comprising both local user devices and dedicated compute nodes. Again, by leveraging otherwise idle assets, resource utilization may be improved while costs are reduced.

Cluster workloads may be allocated across clusters based on real-time assessment of available local resources. In some examples, cluster workloads execute securely on user devices via isolated cluster environments. A central cluster controller or scheduling component may automatically coordinate effective distribution between dedicated compute nodes (e.g., cloud nodes) and user devices (e.g., local machines). This may improve efficiency, reduce waste associated with unused local capacity, and lower infrastructure expenses.

When the effects in this disclosure are considered in aggregate, one or more of the methodologies described herein may thus obviate a need for certain efforts or resources that otherwise would be involved in handling cluster workloads. Computing resources utilized by systems, devices, databases, or networks may be more efficiently utilized or reduced, e.g., as a result of improved local machine utilization. Examples of such computing resources may include processor cycles, network traffic, memory usage, GPU resources, data storage capacity, power consumption, and cooling capacity.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 128. A web client 110 (e.g., a browser) or a programmatic client 108 (e.g., an "app") may be hosted and executed on the user device 106.

An Application Program Interface (API) server 118 and a web server 120 provide respective programmatic and web interfaces to components of the server system 104. A specific application server 116 hosts a cluster workload management system 122, which includes components, modules, or applications.

The user device 106 can communicate with the application server 116, e.g., via the web interface supported by the web server 120 or via the programmatic interface provided by the API server 118. It will be appreciated that, although only a single user device 106 is shown in FIG. 1, a plurality of user devices may be communicatively coupled to the server system 104. In some examples, and as described with reference to FIG. 2, the server system 104 is connected to a pool of user devices to allow monitoring of resource utilization on the user devices and the allocation of at least some of the user devices to clusters. In this way, one or more user devices may be dynamically assigned to clusters to handle cluster workloads (fully or partially).

The user device 106 (and, in some cases, other user devices connected to the server system 104) may be associated with an enterprise or organization, such as a software provider 134, as depicted in FIG. 1. For example, the software provider 134 may have a plurality of workers, such as software developers, and the workers may be provided with respective user devices, with the user device 106 being a non-limiting example of such a user device. The user device 106 may, for example, be a laptop or a desktop computer.

The application server 116 is communicatively coupled to database servers 124, facilitating access to one or more information storage repository, e.g., a database 126. In some examples, the database 126 includes storage devices that store information to be processed by the cluster workload management system 122.

The application server 116 accesses application data (e.g., application data stored by the database servers 124) to provide one or more applications or software tools to the user device 106 via a web interface 130 or an app interface 132. Specifically, in some examples, the application server 116, using the cluster workload management system 122, may provide one or more tools or functions for handling or managing cluster workloads.

The cluster workload management system 122 may be implemented using hardware (e.g., one or more processors of one or more machines) or a combination of hardware and software. For example, cluster workload management system 122 may be implemented by one or more processors configured to perform the operations described herein for that component. The functions described herein for the cluster workload management system 122 may be subdivided among multiple components. The cluster workload management system 122 may be provided by a single machine or device or distributed across multiple machines or devices.

In some examples, the cluster workload management system 122 manages or coordinates execution of cluster workloads across clusters of computing nodes. As described in greater detail elsewhere, a cluster may include user devices, dedicated computing nodes, or combinations thereof.

The cluster workload management system 122 may allow for monitoring of resource utilization on user devices (e.g., user devices associated with the software provider 134) or clusters that include user devices. The cluster workload management system 122 may also be communicatively coupled to dedicated compute nodes (e.g., dedicated cloud-based cluster resources rented or owned by the software provider 134) to monitor resource utilization or available on such compute nodes.

The cluster workload management system 122 may receive workload execution requests and automatically assign cluster workloads to suitable clusters, for example, by matching the resource requirements for a cluster workload in a workload execution request to resource availability in a cluster. The cluster workload management system 122 may provide an interface that allows users to submit workload execution requests and monitor fulfillment of such requests. For example, the cluster workload management system 122 may provide a graphical user interface via the web interface 130 that allows the user 128 to submit a workload execution request. The workload execution request may, for example, indicate that a cluster with 20 CPUs and 300 gigabytes (GB) of memory is desired or required to run a number of applications associated with a software development project.

When a workload execution request is received, the cluster workload management system 122 may evaluate current utilization and availability of resources across existing clusters or across other nodes (e.g., user devices or dedicated compute nodes) that could potentially be added to clusters. In some examples, resource utilization data from device agents running on individual user devices are aggregated to determine which nodes, or which clusters, have sufficient available capacity to meet requested resource requirements. The cluster workload management system 122 may also generate predictions as to resource utilization in a future period to perform a suitable cluster assignment.

In some examples, the cluster workload management system 122 is configured to construct a new cluster in real-time (e.g., in response to a workload execution request). For example, the cluster workload management system 122 may determine that existing clusters do not have the capacity to accommodate the request, and then leverage its connection to a pool of user devices. The cluster workload management system 122 may identify idle or underutilized user devices that can contribute resources (e.g., based on reports received from respective device agents). The cluster workload management system 122 may then construct a new on-demand cluster comprising suitable user devices, optionally together with dedicated compute nodes, to meet the resource requirements.

Once an appropriate cluster is identified or created, the cluster workload management system 122 may assign the workload execution request to that cluster. The cluster workload management system 122 may instruct a cluster to allocate resources, for example, by initializing or selecting cluster environments on the user devices in the cluster. The cluster workload is then executed in a distributed manner across cluster nodes, as described in greater detail elsewhere. The cluster workload management system 122 may include or implement a cluster controller, such as the cluster controller 204 shown in and described with reference to FIG. 2. The cluster controller may be responsible for one or more of the functions of the cluster workload management system 122.

During workload execution, the cluster workload management system 122 may continue to monitor resource utilization data or other metrics (e.g., connectivity, bandwidth, or device location). The cluster workload management system 122 may dynamically scale a cluster by adding or removing nodes (e.g., user devices from the pool of user devices) as needed based on fluctuating resource demands, availability, or restrictions. The cluster workload management system 122 may thus enable robust, on-demand provisioning and efficient utilization of resources.

The cluster workload management system 122 may be responsible for one or more aspects of cluster provisioning.

Provisioning refers to the process of acquiring, allocating, and deploying the necessary compute resources to assemble a cluster. This may include determining the type and quantity of resources needed, requesting and configuring nodes, installing required software or tools on the nodes, or integrating or connecting the nodes into a unified cluster environment.

In some examples, the application server 116 is part of a cloud-based platform provided by the software provider 134 that allows the user 128 to utilize the tools of the cluster workload management system 122. The user 128 may hold a user account with the software provider 134 (e.g., an enterprise account). The user 128 may use account credentials to access the web interface 130 or the app interface 132.

One or more of the application server 116, the database servers 124, the API server 118, the web server 120, and the cluster workload management system 122 may each be implemented in a computer system, in whole or in part, as described below with respect to FIG. 7. In some examples, external applications (which may be third-party applications or applications provided by the software provider 134), such as an external application 114 executing on an external server 112, can communicate with the application server 116 via the programmatic interface provided by the API server 118. For example, a third-party application may support one or more features or functions on a website or platform hosted by a third party, or may perform certain methodologies and provide input or output information to the application server 116 for further processing or publication.

As an example, the cluster workload management system 122 can be linked to one or more external compute nodes provided by a cloud service provider. The external server 112 may provide cloud-based, dedicated compute nodes that are available to the software provider 134 (e.g., rented by the software provider 134). The cluster workload management system 122 may thus communicate with the external server 112 (e.g., via the external application 114 of the external server 112), for example, to monitor resource utilization on the compute nodes, to assign workloads, or to request adjustment (e.g., scaling) of the compute nodes. In some examples, a cluster spans across cloud-based resources, such as the compute nodes of the external server 112, and local resources, such as user devices of the software provider 134.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
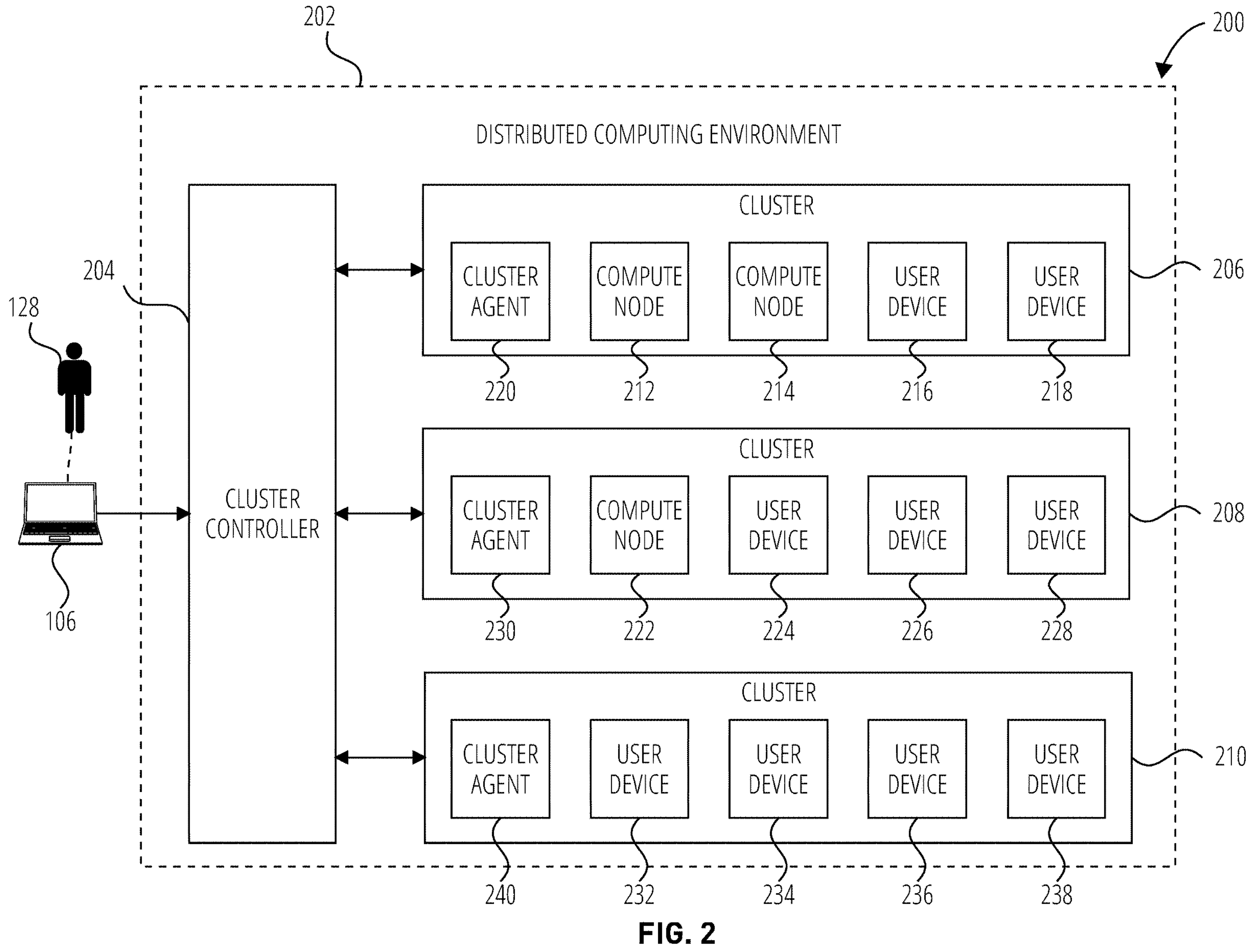
FIG. 2 is a block diagram of certain components in a distributed computing environment, according to some examples.

FIG. 2 is a diagram 200 illustrating certain components in a distributed computing environment 202, according to some examples. The distributed computing environment 202 includes interconnected infrastructure that facilitates coordinated workload processing across clusters of nodes. The distributed computing environment 202 may include physical and virtual assets across user devices, on-premises servers, and cloud-hosted systems.

The distributed computing environment 202 is shown to include a cluster controller 204 that is communicatively coupled to clusters 206, 208, and 210, and to the user device 106 of the user 128 of FIG. 1. The cluster 206 is shown to include a compute node 212, a compute node 214, a user device 216, a user device 218, and a cluster agent 220. The cluster 208 is shown to include a compute node 222, a user device 224, a user device 226, a user device 228, and a cluster agent 230. The cluster 210 is shown to include a user device 232, a user device 234, a user device 236, user device 238, and a cluster agent 240.

The cluster controller 204 oversees and controls the clusters operating within the distributed computing environment 202. In some examples, the cluster controller 204 is provided by the cluster workload management system 122 of FIG. 1 to provide a common management and orchestration system that distributes load and tasks among physical or virtual resources (e.g., nodes).

The cluster controller 204 may receive, aggregate, and evaluate data on cluster resource utilization and availability. For example, the cluster controller 204 evaluates new workload requests (e.g., received from the user device 106 of the user 128) and determines appropriate cluster assignments based on real-time resource metrics and workload needs. The cluster controller 204 may manage scheduling or intra-cluster communication and coordination throughout workload execution. In some examples, the cluster controller 204 provides centralized intelligent management of clusters within the distributed computing environment 202.

The distributed computing environment 202 may include one or more clusters, and the clusters 206-210 of FIG. 2 are primarily shown as examples. Each of the clusters 206-210 is shown to include four nodes and a cluster agent (the cluster agent 220, the cluster agent 230, and the cluster agent 240, respectively). However, as mentioned above, a cluster may include from a few to a large number (e.g., hundreds or thousands) of nodes, and the nodes shown in FIG. 2 are primarily shown as examples.

The cluster 206 includes two dedicated compute nodes (the compute node 212 and the compute node 214) and two user devices (the user device 216 and the user device 218) that also serve as cluster nodes. The cluster 208 includes one dedicated compute node (the compute node 222) and three user devices (the user devices 224-228) that serve as cluster nodes. The cluster 210 includes four user devices (the user devices 232-238) that serve as cluster nodes. The cluster 206 and the cluster 208 may be regarded as hybrid clusters, while the cluster 210 is not a hybrid cluster as it does not include any dedicated compute nodes.

For ease of reference, the descriptions below refer only to the cluster 206 of FIG. 2 as a non-limiting example of cluster. The cluster 206 provides a pooled set of resources for executing cluster workloads. The cluster 206 may be scaled based on workload demands. For example, additional user devices may be added to the cluster 206 to increase its capacity, or user devices (e.g., the user device 216) may be removed from the cluster 206 to reduce capacity.

A dedicated compute node in the cluster 206, such as the compute node 212, represents a dedicated physical or virtual machine instance. It provides a compute resource for cluster workloads executed within the cluster 206. The compute node 212 runs its assigned portions of cluster workloads. The compute node 212 may scale to meet workload processing demands. In the context of this disclosure, a dedicated cluster compute node, such as the compute node 212, does not run user workloads.

The cluster agent 220 of the cluster 206 is a processor-implemented component that monitors the resources within the cluster 206. For example, the cluster agent 220 tracks utilization metrics for the cluster nodes. The cluster agent 220 may aggregate and report data on utilization or availability of nodes to the cluster controller 204. The cluster agent 220 may also facilitate integration of user devices into a cluster by interfacing with device agents, as described below with reference to FIG. 4.

Various deployment and execution techniques may be used to provide the cluster 206. For example, Kubernetes™ is an open-source system for deployment of clusters. In the Kubernetes™ framework, clusters allow containers to run across multiple machines and environments. The containers are not restricted to a specific operating system, unlike traditional virtual machines. The nodes in the cluster 206 (e.g., the compute node 212, the compute node 214, the user device 216, and the user device 218) may use the containers to run applications in the cluster 206.

In the Kubernetes™ framework, when a new workload execution request is assigned to the cluster 206, the cluster controller 204 may communicate details thereof to a Kubernetes™ API server running in the cluster 206. The API server may validate the workload execution request and store workload specifications, such as application containers needed for the workload, computing resource requirements for each container (CPU, memory, etc.), and policies on how the containers should run (restart, replication, etc.). A scheduler component (which may be the cluster controller 204 or another component) applies predefined algorithms to determine how to distribute the required containers across the available nodes. The scheduler component may be configured to optimize workload distribution for performance while minimizing resource contention.

Still referring to the Kubernetes™ framework, each node may run a "kubelet" agent to launch the required containers. The kubelet communicates with the container runtime, for example, to pull the relevant images and start the containers. As the workload runs, the agent monitors resource usage by those containers and reports metrics back to the API server.

Accordingly, in some examples, a Kubernetes™ framework may be used and the relevant resources, such as the compute node 212, the compute node 214, the user device 216, and the user device 218 of the cluster 206, can be registered as nodes to join the cluster 206. However, it is noted that the Kubernetes™ framework is described as a non-limiting example, and other cluster deployments are possible. For example, user devices may be handled differently than dedicated compute nodes. For each user device in a cluster, a relatively small virtual machine may be provisioned as part of the cluster to run cluster workloads to provide separation from or prevent interference with user workloads.

In some examples, at least some of the components shown in FIG. 2 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, for some components, two or more components may be combined into a single component, or the functions described herein for a single component may be subdivided among multiple components.

Figure 3:
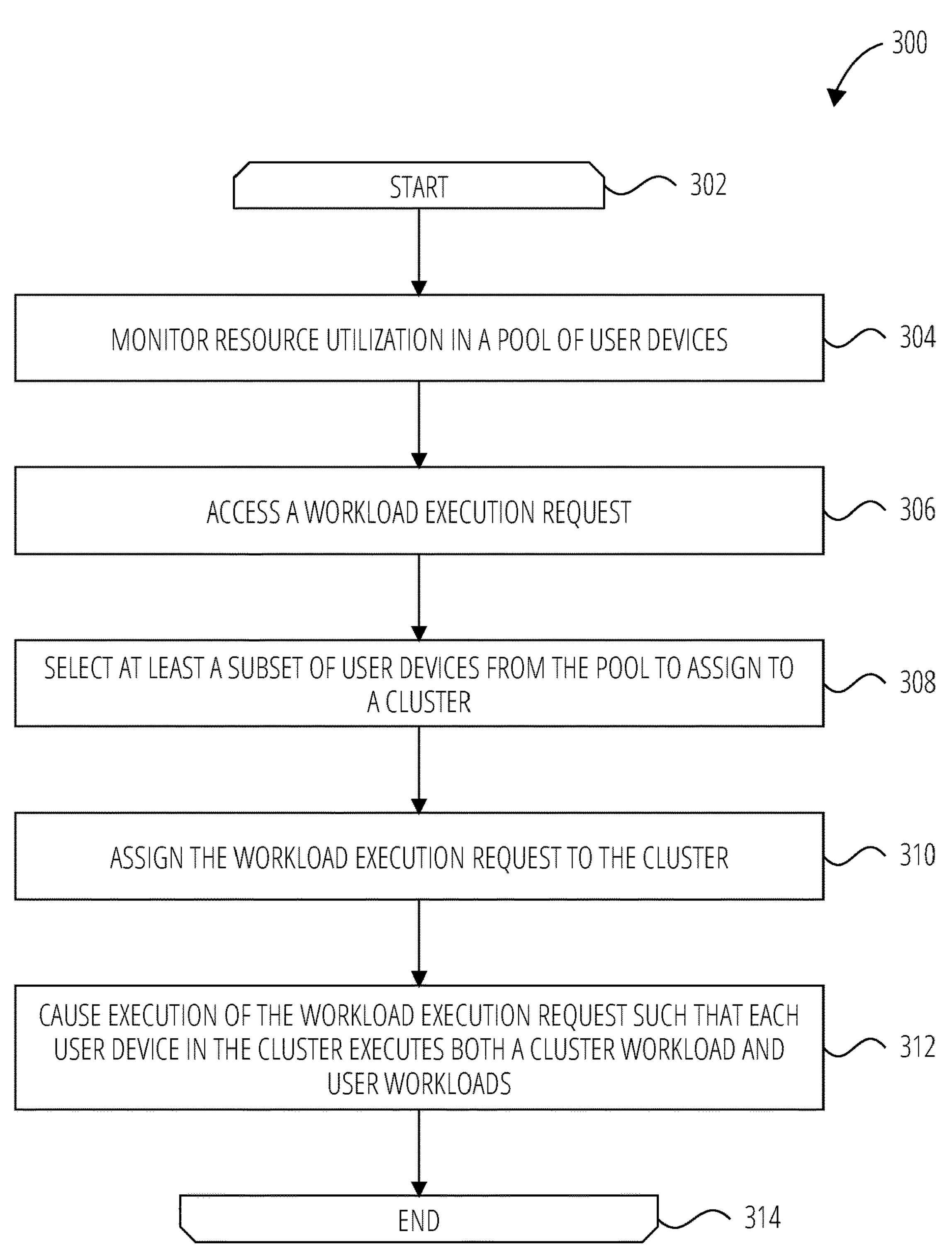
FIG. 3 is a flowchart illustrating operations of a method suitable for assigning user devices to a cluster and using the cluster to handle a cluster workload.

FIG. 3 is a flowchart illustrating operations of a method 300 suitable for assigning user devices to a cluster and executing a cluster workload. By way of example and not limitation, aspects of the method 300 may be performed by the components, devices, or systems shown in FIG. 1 or FIG. 2. Accordingly, the cluster controller 204 and the cluster 206 of FIG. 2 are used as non-limiting examples below.

The method 300 commences at opening loop element 302 and proceeds to operation 304, where the cluster controller 204 monitors resource utilization in a pool of user devices. Some user devices in the pool may form part of preexisting clusters, while other user devices are not assigned to clusters. The user devices are used by their respective users to execute user workloads.

For example, the various user devices shown in FIG. 2 may be dynamically selected from a pool of user devices that is continuously monitored by the cluster workload management system 122 or the cluster controller 204. An organization may monitor the resource utilization of the user devices of its workers that are all connected via a network, and use the cluster controller 204 to dynamically assign user devices from the pool with excess or sufficient spare capacity into one of the clusters 206-210, remove user devices from clusters, or establish new clusters that include one or more of the user devices from the pool.

Resource utilization may be monitored in various ways. For example, metrics such as current CPU and memory utilization, available storage, or network resource usage can be used to quantify resource utilization. A device agent running on a user device may check and report on the resource utilization of the user device. The reports may be aggregated centrally in a cluster (e.g., by a cluster agent) or by the cluster controller 204 that operates outside of the cluster. In some examples, and as described further with reference to FIG. 4, the device agent specifically checks the resource utilization of the user device against predetermined restrictions or cluster contribution criteria to determine (or to facilitate downstream determination of) whether the user device has sufficient excess or spare resources to be eligible for a cluster.

In some examples, the cluster controller 204 checks the resource utilization data as received from each user device or cluster. The resource utilization data may indicate, or be processed to indicate, whether a user device has sufficient excess or spare capacity to contribute to a cluster. In the case of a preexisting cluster, the resource utilization data may indicate the capacity of the cluster to handle new workload execution requests. For example, the resource utilization data from all the nodes in a cluster may be aggregated (e.g., by a cluster agent) and reported to the cluster controller 204 for evaluation.

At operation 306, the cluster controller 204 accesses a workload execution request. For example, the cluster controller 204 receives a new workload execution request from the user device 106 of the user 128. The workload execution request may, for example, indicate that the user 128 requires a cluster that can handle a certain cluster workload. The workload execution request may thus include resource requirements of the cluster workload (e.g., how many CPUs of a certain type are needed, what the memory resource requirements are, and the storage space expected to be utilized).

The resource requirements may be identified based on tasks or operations forming part of the cluster workload. For example, the workload execution request may specify one or more applications that the user 128 wishes to run on a cluster. The cluster controller 204 may then determine the resource requirements (e.g., CPU, GPU, main memory, or storage resources) based on an assessment of the applications to be handled.

In some cases, the workload execution request may specify additional resource requirements, such as requirements regarding a location of the cluster. For example, the cluster may need to be located within the European Union to comply with data regulations, or the user 128 may wish to utilize a cluster with user devices located in the same office as the user 128 to reduce or minimize latency.

At operation 308 of the method 300, the cluster controller 204 selects at least a subset of user devices from the pool to assign to a cluster. For example, the cluster controller 204 may detect that the user device 216 and the user device 218 of FIG. 2 are eligible to be added to a cluster, and assign them to the cluster 206. As mentioned, the cluster 206 is a hybrid cluster. In other examples, a user device may be added to a cluster that exclusively consists of user device nodes (e.g., the cluster 210 of FIG. 2).

The method 300 proceeds to operation 310, where the workload execution request is assigned to the cluster 206. In some examples, as described above, the cluster 206 may be formed or configured in response to receiving the workload execution request so as to match or accommodate the resource requirements of the workload execution request. In other examples, the cluster 206 may be a preexisting cluster (at the time of receiving the workload execution request) that is determined by the cluster controller 204 to have sufficient free resources to handle or accommodate the workload execution request.

The cluster controller 204 then causes execution of the workload execution request on the cluster 206 at operation 312. For example, the cluster controller 204 may transmit an instruction to the cluster 206 to handle the workload execution request, after which the cluster 206 automatically distributes the cluster workload across one or more of its nodes. The cluster 206 may perform automatic scheduling of tasks and assign the tasks (e.g., containerized applications) to respective nodes.

The user device 216 and the user device 218 thus each proceed to execute both a respective portion of the assigned cluster workload and their respective user workloads (e.g., the normal workload of the user device 216 that is unrelated to the cluster 206). In some examples, the user device 216 and the user device 218 execute their one or more respective user workloads simultaneously or at least partially concurrently with one or more respective cluster workloads. This allows a user device, such as the user device 216, to contribute to a cluster even while the user device is not otherwise "idle," such as while the user device is being directly operated by the user to run user-driven applications.

On the other hand, the compute node 212 and the compute node 214, as dedicated cluster resources, handle only the cluster workload and do not handle user workloads. Accordingly, in the case of the cluster 206, user devices are utilized to take up a portion of the cluster workload, while conventional, dedicated compute nodes take up the remainder of the cluster workload. This may reduce the overall requirement for dedicated compute nodes, as well as the associated infrastructure costs.

While the cluster workload is being executed on the cluster 206, the cluster controller 204 may continuously monitor resource utilization within the cluster 206 and adjust the cluster 206 to the extent required. For example, if the cluster controller 204 determines that the user workload on the user device 216 has ramped up to such an extent that the user device 216 can no longer contribute to the cluster 206 (e.g., the user device 216 is using most of its CPU and memory resources to handle its own user workload), it may automatically remove the user device 216 from the cluster 206 and add another node to the cluster 206. For example, the cluster controller 204 may add another user device (e.g., from the pool of user devices) to the cluster 206 to handle part of the cluster workload. The method 300 concludes at closing loop element 314.

The use of user devices to assist with cluster workloads may be highly beneficial. For example, in a cluster application development scenario, a development team may utilize a cluster of user devices available within an organization to run general purpose applications with relatively lightweight resource requirements, while using cloud-based, dedicated compute nodes to run more specialized operations, such as an in-memory database that may require hundreds of processing cores and terabytes of main memory. The resources provided by the user devices may be cheaper than specialized resources that, for example, have to be rented from a cloud service provider.

As mentioned, the cluster controller 204 may control or interface with multiple clusters. Examples described herein provide a coordinated and automated technique that assigns resources across multiple clusters and user devices. The cluster controller 204 may have a global view that goes beyond individual cluster boundaries. For example, rather than independently scaling each cluster, the cluster controller 204 may assign user devices from a shared resource pool to supplement specific clusters on demand. The cluster controller 204 may determine which user devices have enough spare capacity to take on additional workload and temporarily add them as active participants in a cluster.

In some examples, coordinated pooling and assignment of user devices (optionally together with cloud-based, dedicated compute nodes) provides dynamic scalability. A system as described herein may elastically grow cluster capacity by onboarding resources from a user device pool.

Figure 4:
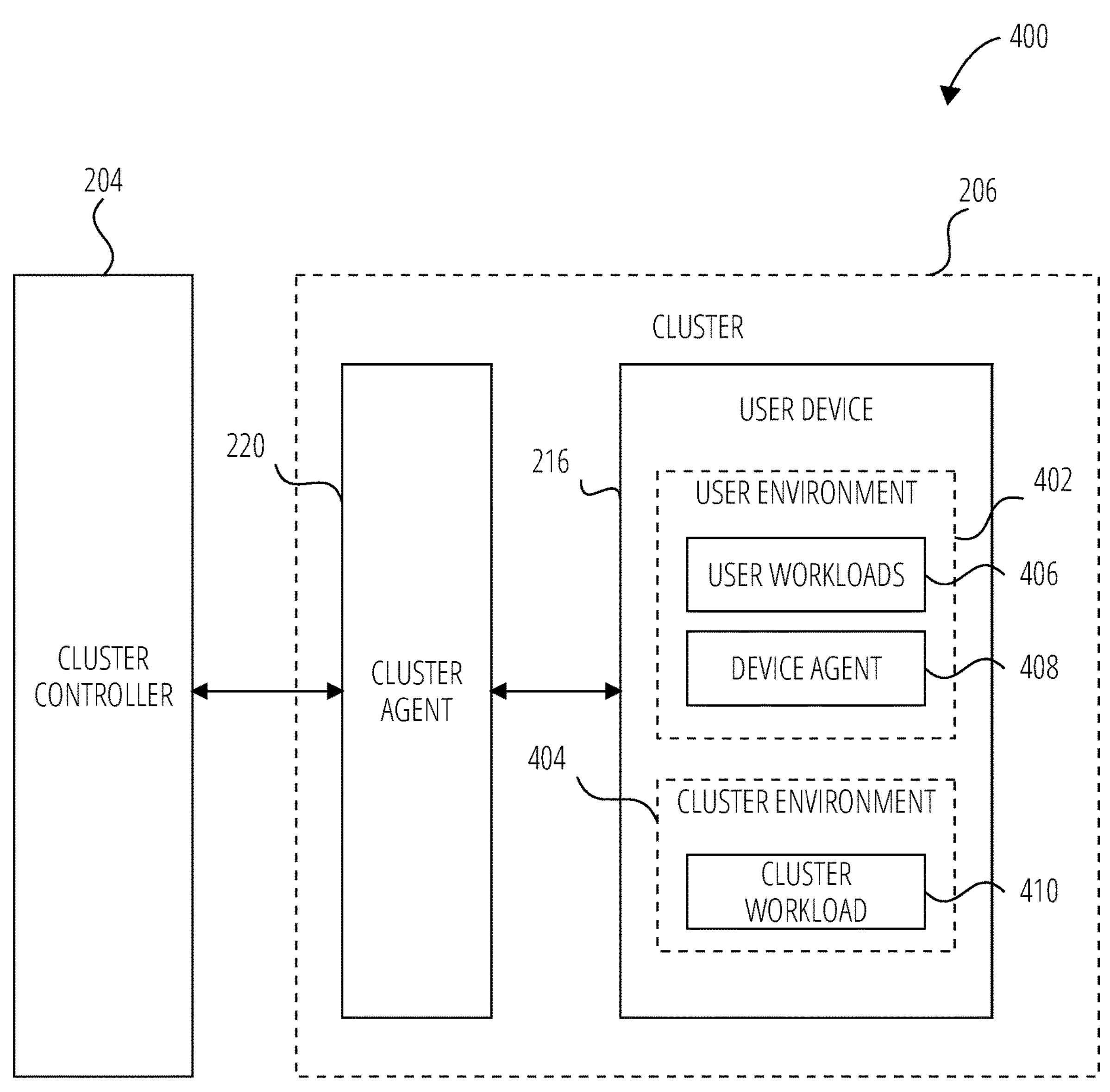
FIG. 4 is a block diagram of a cluster controller and certain components within a cluster that is communicatively coupled to the cluster controller, according to some examples.

FIG. 4 is a diagram 400 of the cluster controller 204 and certain components of the cluster 206 of FIG. 2, according to some examples. In the diagram 400, only the cluster agent 220 and one of the nodes of the cluster 206 (the user device 216) are shown to illustrate certain aspects of the present disclosure.

The user device 216 is shown to implement a user environment 402 and a cluster environment 404. User workloads 406 and a device agent 408 execute in the user environment 402, while a cluster workload 410 executes in the cluster environment 404. While the user device 216 is shown as being part of the cluster 206, it will be appreciated that, at certain points in time (e.g., when the user device 216 does not have sufficient excess capacity), the user device 216 may be removed from the cluster 206 to cause it to run only the user workloads 406. Alternatively, the user device 216 may remain in the cluster 206 but be flagged as unable/ineligible to contribute to the handling of a cluster workload.

The user environment 402 may provide a native execution space on the user device 216. The user environment 402 is used to run a user's own applications (as an example of user workloads). For example, the user environment 402 may be provided by a native operating system and installed applications, such as "office" software, browsers, or integrated development environments (IDEs). The user environment 402 may further provide a default space where background processes and services of the user device 216 execute.

In some examples, the device agent 408 is installed and executes in the user environment 402. The device agent 408 may be a lightweight software module installed on the user device 216 to monitor resource utilization. Alternatively or additionally, the device agent 408 may process the resource utilization data to determine whether the user device 216 is eligible to be added to a cluster (e.g., in a case where the user device 216 is not part of a cluster at a given point in time) or how much (e.g., what quantity or quantities of) resources it can contribute to a cluster.

As mentioned, cluster contribution criteria may specify that a user device can be added to a cluster under certain conditions. For example, the device agent 408 may check whether available CPU resources and available memory resources exceed predetermined thresholds. In some examples, the device agent 408 may consider custom configurations or settings on the specific user device 216. For example, a user of the user device 216 may specify certain resource availability thresholds or user-defined constraints. As an example, a user might not want to contribute to a cluster in cases where the user device 216 is running on battery power (e.g., not connected to an electricity supply), or when the user is working from home (e.g., to avoid increasing their home electricity bill due to cluster contributions). The device agent 408 (or another component, such as the cluster agent 220 or the cluster controller 204) may take such constraints or criteria into account and make cluster allocations accordingly. The device agent 408 may also consider historical data to predict or identify suitable times for cluster contribution. For example, the device agent 408 may detect that the user of the user device 216 is inactive or less active during a certain period on most days (e.g., between 1:00 pm and 2:00 pm when the user takes their lunch break) and use, propose, or identify this time period as a cluster contribution time period.

The device agent 408 may obtain resource utilization data and report such data (e.g., in the form of metrics) to the cluster agent 220. In some examples, the device agent 408 collects real-time utilization data across key resources, such as CPU, memory, disk, and network. The device agent 408 may track which applications and processes are consuming resources to determine available spare capacity. Configuration settings may control how much of the total capacity of the user device 216 is shareable or contributable to the cluster 206.

The device agent 408 may transmit reports, such as utilization summaries, to the cluster agent 220 on a regular basis. In some examples, the device agent 408 determines how much latent capacity can be contributed to a cluster without significantly impacting local user experience. The device agent 408 may also monitor for defined constraints that temporarily prevent cluster contribution (e.g., if the database 126 has limited Internet connectivity or is located outside of a certain geographic area, such as the European Union, the device agent 408 may prevent cluster contribution).

Specific implementations of the device agent 408 may have one or more of the following features:

- The device agent 408 is installed locally on the user device 216 to run in the user environment 402.
- The device agent 408 collects resource utilization data (e.g., utilization metrics) and causes them to be transmitted to the cluster agent 220. The device agent 408 may also check cluster contribution criteria other than resource utilization, such as latency and user device location.
- The device agent 408 has preconfigured settings that indicate the maximum CPU resources (e.g., maximum percentage of total CPU) or maximum memory resources (e.g., maximum percentage of total memory) the user device 216 may offer to a cluster.
- The device agent 408 has preconfigured settings that indicate the minimum CPU resources (e.g., minimum percentage of total CPU) or minimum memory resources (e.g., minimum percentage of total memory) that must remain available for user workloads 406 in the user environment 402.
- Based on current resource utilization and cluster contribution criteria (e.g., maximum and minimum settings described above, connectivity, latency, or device location) the device agent 408 determines whether the user device 216 can contribute to a cluster. For example, if the user device 216 has sufficient idle resources and all other cluster contribution criteria are met, the device agent 408 determines that the user device 216 can contribute to a cluster. On the other hand, if the user device 216 does not have sufficient resources to offer, or some other cluster contribution criterion is not met (e.g., the user device does not have Internet connectivity or the user device is in a restricted location), the device agent 408 determines that the user device 216 cannot contribute to the cluster.
- The device agent 408 notifies the cluster agent 220 (or the cluster controller 204) as to whether the user device 216 can contribute to a cluster. Alternatively or additionally, the device agent 408 notifies the cluster agent 220 (or the cluster controller 204) as to how much resources the user device 216 can contribute to the cluster.
- The device agent 408 may, in some examples, be responsible for establishing a connection with a selected or instructed cluster to enable the user device 216 to contribute to the cluster.

While examples above indicate that the device agent 408 determines whether the user device 216 can contribute to a cluster, in other examples, the cluster controller 204 uses feedback (e.g., resource utilization data or data relating to other cluster contribution criteria) to determine whether the user device 216 can contribute to a cluster. In any event, if the user device 216 is designated as ineligible or unable to contribute to a cluster at a given stage or point in time, the user device 216 may be temporarily removed from the cluster 206 or, if the user device 216 was not yet assigned to the cluster 206, it may be temporarily removed from a pool of candidate user devices.

The cluster environment 404 may provide an isolated execution space or an execution space that is otherwise separated from the general environment where user workloads 406 are executed. The cluster environment 404 allows the user device 216 to contribute resources to the cluster while ensuring that the cluster workload 410 runs securely or in such a manner that it is protected or separated from the user environment 402. In some examples, and as described elsewhere, the user device 216 may be configured to prioritize the user workloads 406 over a cluster workload 410 such that the cluster workload 410 is only "taken on" when the user device 216 meets cluster contribution criteria (e.g., sufficient excess resources, connectivity, power or battery life, and availability).

The cluster environment 404 may be provided, for example, by one or more virtual machines or one or more containers provisioned to the user device 216. However, virtual machines and containers are non-limiting examples, and other "sandbox" or virtualized runtime environments may be utilized that provide a separation between the local environment on the user device 216 and the network or cluster environment of the cluster 206.

During operation, as the user device 216 runs its user workloads 406, its resource utilization profile may be dynamic. At a first point in time, its resource utilization may be sufficiently low to cause the device agent 408 (or another component, such as the cluster agent 220 or the cluster controller 204) to mark it as eligible for cluster contribution (e.g., in a list of pooled user devices maintained in a database, such as the database 126 of FIG. 1). At a second point in time, the capacity taken up by the user workloads 406 may increase, resulting in less resources being available for use with respect to cluster workloads. The device agent 408 or the cluster controller 204 may, in response, mark the user device 216 as ineligible or unavailable and it may be removed from a cluster or from a list of available cluster resources.

In some examples, the cluster workload 410 is a portion of a distributed job executed on the user device 216 within the cluster environment 404. The cluster workload 410 may be executed simultaneously with one or more of the user workloads 406 to improve the overall resource utilization within the user device 216.

Turning again to the cluster agent 220, the cluster agent 220 may be regarded as a "cluster metrics agent" in some examples. The cluster agent 220 may run in the cluster 206 to collect resource utilization metrics from the nodes in the cluster 206, aggregating real-time resource utilization data from the nodes. In some examples, the cluster agent 220 determines, based on the aggregated resource utilization data from the nodes in the cluster 206, how much resources the cluster 206 is able to offer to a cluster user (e.g., the user 128 wishing to execute a cluster workload).

In some examples, the cluster agent 220 enables the cluster controller 204 to query nodes in the cluster 206. For example, the cluster agent 220 may provide APIs for the cluster controller to query node status or capacity. The cluster agent 220 may use algorithms to predict availability and ensure that nodes are not overutilized.

In some examples, the cluster agent 220 may trigger throttling of cluster workloads or disabling of nodes as needed to maintain performance. The cluster agent 220 may also handle aspects of workload scheduling based on directives from the cluster controller 204.

As mentioned elsewhere, the cluster controller 204 may control or interface with multiple clusters, such as the clusters 206-210 of FIG. 2. A cluster may be registered to the cluster controller 204 such that the cluster controller 204 receives resource utilization data and other information regarding the cluster. In this way, when the cluster controller 204 receives an incoming workload execution request, the cluster controller 204 may assign the workload execution request to an appropriate cluster based on the resources that the cluster has available (or is predicted to have available based on historic data). The cluster controller 204 then dispatches the relevant cluster workload to the cluster for execution. In some cases, the cluster controller 204 may create a new cluster on demand, in response to receiving a workload execution request (e.g., where no cluster that matches the resource requirements of the workload execution request is available).

In some examples, the cluster controller 204 may communicate directly with the device agent 408. For example, the cluster controller 204 may transmit, to the device agent 408 executing on the user device 216, an instruction to initiate or trigger the cluster environment 404. For example, the cluster controller 204 may transmit an instruction to the user device 216 to allocate a first portion of resources on the user device 216 to the cluster 206 via the cluster environment 404, with a second portion of resources on the user device 216 then being used to execute the user workloads 406. As mentioned above, resource usage may be dynamic and these "portions" are thus not necessarily fixed.

The cluster controller 204 may notify user devices of their inclusion in a cluster. For example, the cluster controller 204 may select the user device 216 from a pool of user devices and add it to the cluster 206. The cluster controller 204 may then transmit a message to the user device 216 to indicate that the user device 216 has been assigned to the cluster 206. In some examples, the user device 216 initiates or implements the cluster environment 404 in response to receiving such a message.

In some examples, at least some of the components shown in FIG. 4 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, for some components, two or more components may be combined into a single component, or the functions described herein for a single component may be subdivided among multiple components.

Figure 5:
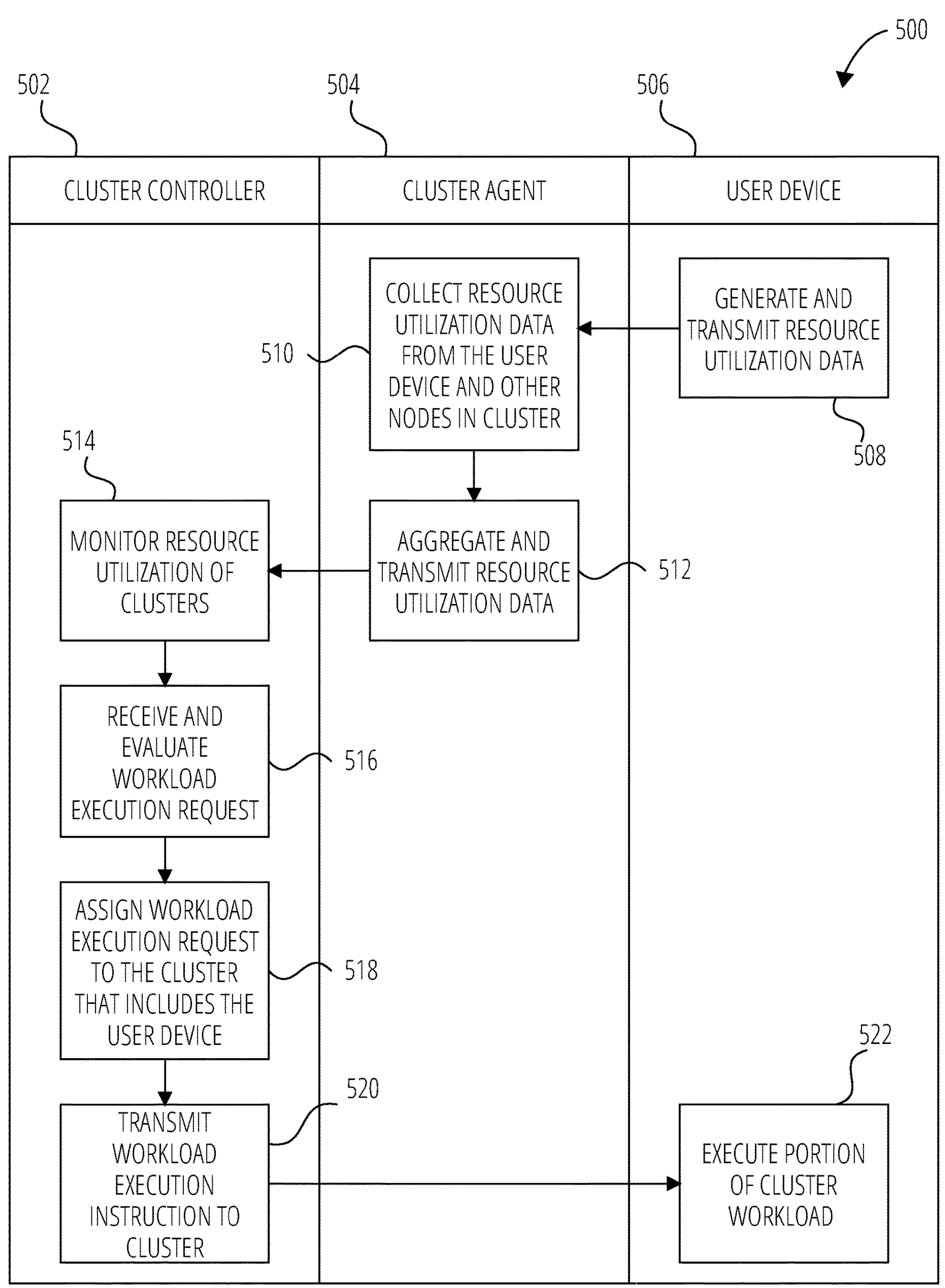
FIG. 5 is a swim lane diagram illustrating operations performed by a cluster controller, a cluster agent, and a user device, respectively, to monitor resource utilization, assign a workload execution request to a cluster, and fulfill the workload execution request, according to some examples.

FIG. 5 is a swim lane flowchart illustrating operations performed by a cluster controller 502, a cluster agent 504, and a user device 506 in a method 500 that includes monitoring resource utilization, assign a workload execution request to a cluster, and fulfilling the workload execution request, according to some examples. The cluster controller 502 may be similar to the cluster controller 204 of FIG. 2, the cluster agent 504 may be similar to one of the cluster agents 220, 230, 240 of FIG. 2, and the user device 506 may be similar to the user device 216 of FIGS. 2 and 4.

The user device 506 is operated by a user (e.g., an employee of the software provider 134 of FIG. 1). In the example method 500 of FIG. 5, the user device 506 has already been assigned to a cluster (e.g., the cluster 206, 208, or 210 of FIG. 2) that includes the cluster agent 504 and is controlled by the cluster controller 502. As mentioned, a cluster may include one or more other user devices, one or more dedicated compute nodes, or combinations thereof. The user device 506 may have been dynamically assigned to the cluster from a pool of user devices, as described elsewhere.

During operation, the user device 506 executes user workloads. At operation 508, the user device 506 generates resource utilization data and transmits the resource utilization to the cluster agent 504. For example, the user device 506 may have a device agent, such as the device agent 408 of FIG. 4, running thereon that is responsible for collecting the resource utilization data and causing the data to be sent to the cluster agent 504. The device agent may run as a background process such that resource utilization data is collected and sent to the cluster agent 504 without requiring any active selections or input from a user. The resource utilization data may indicate how much resources the user device 506 can offer or contribute to the cluster (e.g., how much the user device 506 can "spare" while running its own user workloads).

At operation 510, the cluster agent 504 running on the cluster receives the resource utilization data from the user device 506, and also collects resource utilization data from other nodes in the cluster. The cluster agent 504 aggregates the resource utilization data of all the nodes in the cluster and transmits the aggregated resource utilization data to the cluster controller 502 at operation 512.

The cluster controller 502 receives the aggregated resource utilization data from the cluster agent 504, and also receives aggregated resource utilization data for other clusters it controls. At operation 514 of the method 500, the cluster controller 502 monitors the respective utilization of the clusters it controls (e.g., to track, for each cluster, its available capacity, or to predict, based on historic capacity, the expected capacity of each cluster in a future period).

At operation 516, the cluster controller 502 receives and evaluates a new workload execution request. The cluster controller 502 may be provided by, or form part of, a cluster workload management system, such as the cluster workload management system 122 of FIG. 1. The workload execution request may originate from a user, such as the user 128 of FIG. 1, who wishes to assign or offload one or more computing tasks to a cluster.

The cluster controller 502 may use the workload execution request to determine or identify resource requirements of a cluster workload to be assigned to one of its clusters. The cluster controller 502 may compare the resource requirements of the cluster workload with the available resources, or predicted available resources, of each cluster. In the method 500 of FIG. 5, the cluster controller 502 determines that the cluster that includes the user device 506 is capable of handling the new cluster workload, and thus assigns the workload execution request to the cluster at operation 518.

At operation 520, the cluster controller 502 transmits a workload execution instruction to the selected cluster. In other words, the cluster controller 502 may decide which cluster to assign the particular workload to and then forward the workload execution instruction to that cluster. Conventional cluster techniques may be applied to ensure proper scheduling of the relevant tasks or jobs within the cluster, thereby distributing the cluster workload across at least some of the nodes in the cluster, including the user device 506. The user device 506 then executes its respective portion of the cluster workload at operation 522.

The device agent executed at the user device 506 may restrict the resources of the user device 506 that can be applied to the cluster workload. For example, predetermined configurations or settings may dictate that the user device 506 may use no more than a certain percentage of its CPU resources or memory resources to work on the cluster workload. In this way, the user device 506 can still handle its user workloads without the user experiencing significant effects.

Techniques described herein may enable local machines that handle user workloads as their primary function to dynamically contribute to cluster workloads as needed, while maintaining local performance for the users of those devices in a robust manner. In some examples, benefits are obtained while minimizing performance impact on an end user of a user device that is contributing resources to a cluster. In some examples, a user may be unaware that their machine's resources are being utilized for cluster workloads due to the effective "background" management and balancing of resources used for user workloads and cluster workloads.

However, in some examples, the cluster workload management system 122 may transmit a notification to a user device to indicate that the user device is assigned to, or participating in, a cluster. For example, a system may be implemented such that the user device may only be considered for cluster contributions after the user has explicitly opted in or agreed to allow the user device to be added to one or more clusters.

In some examples, clusters may be configured to be substantially resilient against potential failures. For example, by pooling a large number of user devices into a cluster, an individual device shutting down or dropping off the network may have a minimal effect. Cluster management components, such as the cluster controller 204, may detect the node failure and automatically reassign workloads to other available nodes, add additional nodes, or combinations thereof. For example, if a user device is shut down by a user or otherwise becomes available, the device agent may notify the cluster that the node is no longer available. Containers or applications that were running on the user device may then automatically be rescheduled or reassigned to other nodes.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: monitoring resource utilization on a plurality of user devices via a device agent executing on each of the plurality of user devices; accessing a workload execution request that identifies resource requirements of a cluster workload; assigning, based on the resource requirements of the cluster workload and the resource utilization on the plurality of user devices, the workload execution request to a cluster comprising the plurality of user devices; and causing the workload execution request to be executed on the cluster, wherein user workloads and a respective portion of the cluster workload execute on each of the plurality of user devices.

In Example 2, the subject matter of Example 1 includes, wherein the cluster comprises the plurality of user devices and one or more dedicated compute nodes, and a respective portion of the cluster workload executes on each dedicated compute node.

In Example 3, the subject matter of any of Examples 1-2 includes, the operations further comprising, for each user device: assigning the user device to the cluster based on the user device meeting one or more cluster contribution criteria.

In Example 4, the subject matter of any of Examples 1-3 includes, wherein the monitoring of the resource utilization on the plurality of user devices comprises monitoring resource utilization on a pool of user devices that includes the plurality of user devices, the operations further comprising: selecting the plurality of user devices from the pool of user devices; and assigning the plurality of user devices to the cluster.

In Example 5, the subject matter of any of Examples 1~4 includes, wherein the monitoring of the resource utilization on the plurality of user devices comprises using the device agent of each user device to determine that the user device has excess resources available to contribute to the cluster.

In Example 6, the subject matter of any of Examples 1-5 includes, wherein the device agent executing on each user device determines resources that the user device can contribute to the cluster while executing the user workloads.

In Example 7, the subject matter of Example 6 includes, wherein the monitoring of the resource utilization on the plurality of user devices comprises receiving, from the device agent executing on each user device, an indication of the resources that the user device can contribute to the cluster while executing the user workloads.

In Example 8, the subject matter of any of Examples 6-7 includes, wherein a cluster agent executing on the cluster aggregates resource utilization data from the device agents of the plurality of user devices, and the monitoring of the resource utilization on the plurality of user devices comprises receiving, from the cluster agent, the aggregated resource utilization data.

In Example 9, the subject matter of any of Examples 1-8 includes, wherein causing the workload execution request to be executed on the cluster comprises: transmitting, to the device agent executing on each user device, an instruction to allocate a first portion of resources on the user device to the cluster, wherein a second portion of the resources on the user device is used to execute the user workloads.

In Example 10, the subject matter of Example undefined includes, wherein causing the workload execution request to be executed on the cluster comprises causing, on each user device, at least part of the user workloads and at least part of the respective portion of the cluster workload to be executed simultaneously.

In Example 11, the subject matter of any of Examples 1-10 includes, wherein the cluster workload executes in a cluster environment on the user device, the cluster environment being separated from a user environment on the user device in which the user workloads execute.

In Example 12, the subject matter of Example 11 includes, wherein the cluster environment comprises at least one of a virtual machine or a container.

In Example 13, the subject matter of any of Examples 1-12 includes, wherein the workload execution request is assigned to the cluster by a processor-implemented cluster controller that is communicatively coupled to the cluster and to a plurality of other clusters in a distributed computing environment.

In Example 14, the subject matter of any of Examples 1-13 includes, the operations further comprising, for each user device: transmitting a message to the user device to indicate that the user device has been assigned to the cluster.

Example 15 is a method comprising: monitoring resource utilization on a plurality of user devices via a device agent executing on each of the plurality of user devices; accessing a workload execution request that identifies resource requirements of a cluster workload; assigning, based on the resource requirements of the cluster workload and the resource utilization on the plurality of user devices, the workload execution request to a cluster comprising the plurality of user devices; and causing the workload execution request to be executed on the cluster, wherein user workloads and a respective portion of the cluster workload execute on each of the plurality of user devices.

In Example 16, the subject matter of Example 15 includes, wherein the cluster comprises the plurality of user devices and one or more dedicated compute nodes, and a respective portion of the cluster workload executes on each dedicated compute node.

In Example 17, the subject matter of any of Examples 15-16 includes, wherein the cluster workload executes in a cluster environment on the user device, the cluster environment being separated from a user environment on the user device in which the user workloads execute.

Example 18 is a non-transitory computer-readable medium that stores instructions that, when executed by one or more processors, cause the one or more processors to perform operations comprising: monitoring resource utilization on a plurality of user devices via a device agent executing on each of the plurality of user devices; accessing a workload execution request that identifies resource requirements of a cluster workload; assigning, based on the resource requirements of the cluster workload and the resource utilization on the plurality of user devices, the workload execution request to a cluster comprising the plurality of user devices; and causing the workload execution request to be executed on the cluster, wherein user workloads and a respective portion of the cluster workload execute on each of the plurality of user devices.

In Example 19, the subject matter of Example 18 includes, wherein the cluster comprises the plurality of user devices and one or more dedicated compute nodes, and a respective portion of the cluster workload executes on each dedicated compute node.

In Example 20, the subject matter of any of Examples 18-19 includes, wherein the respective portion of the cluster workload executes in a cluster environment on each user device, the cluster environment being separated from a user environment on the user device in which the user workloads execute.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 6:
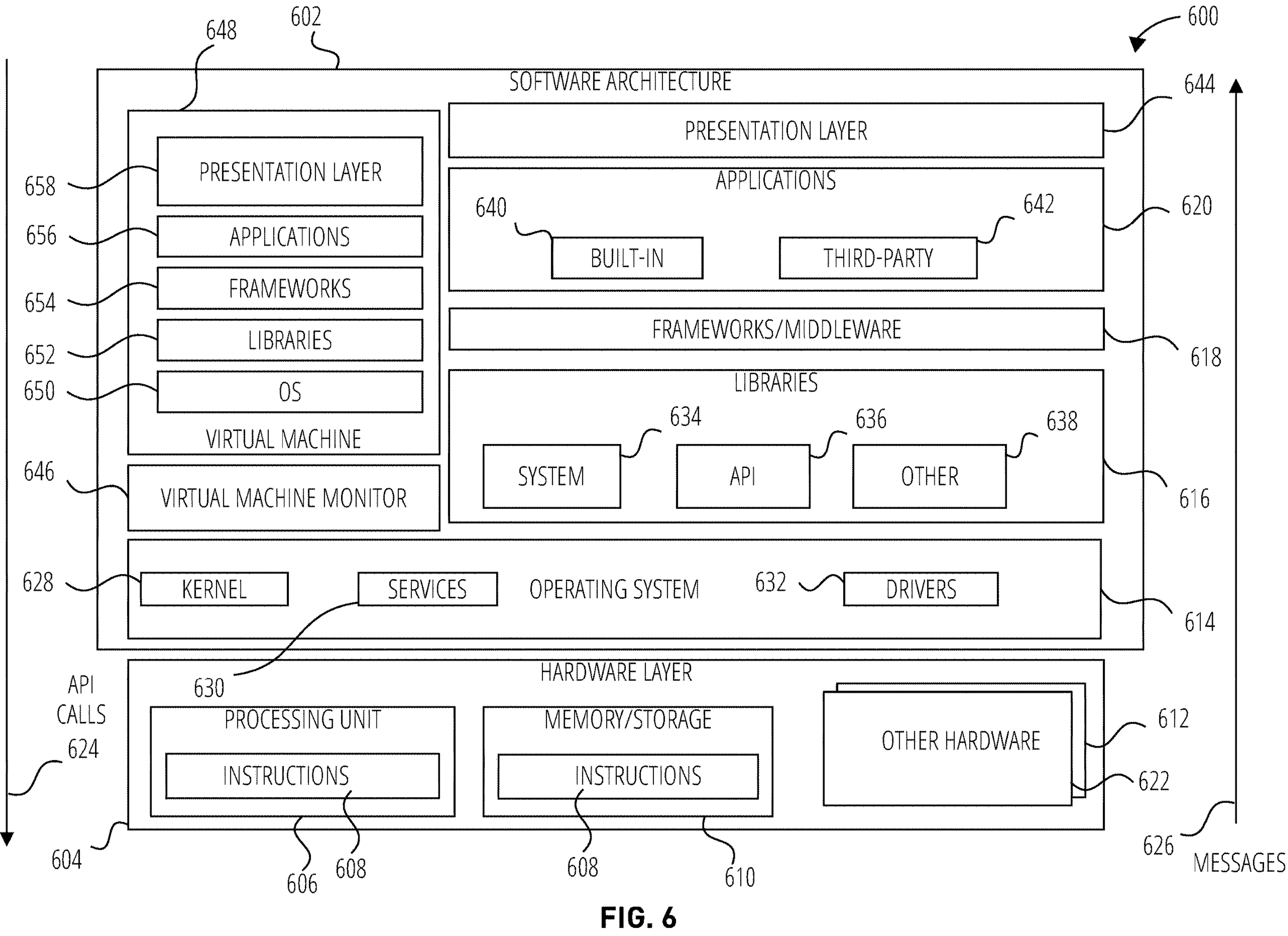
FIG. 6 is a block diagram showing a software architecture for a computing device, according to some examples.

FIG. 6 is a block diagram 600 showing a software architecture 602 for a computing device, according to some examples. The software architecture 602 may be used in conjunction with various hardware architectures, for example, as described herein. FIG. 6 is merely a non-limiting illustration of a software architecture, and many other architectures may be implemented to facilitate the functionality described herein. A representative hardware layer 604 is illustrated and can represent, for example, any of the above referenced computing devices. In some examples, the hardware layer 604 may be implemented according to the architecture of the computer system of FIG. 7.

The representative hardware layer 604 comprises one or more processing units 606 having associated executable instructions 608. Executable instructions 608 represent the executable instructions of the software architecture 602, including implementation of the methods, modules, subsystems, and components, and so forth described herein and may also include memory and/or storage modules 610, which also have executable instructions 608. Hardware layer 604 may also comprise other hardware as indicated by other hardware 612 and other hardware 622 which represent any other hardware of the hardware layer 604, such as the other hardware illustrated as part of the software architecture 602.

In the architecture of FIG. 6, the software architecture 602 may be conceptualized as a stack of layers where each layer provides particular functionality. For example, the software architecture 602 may include layers such as an operating system 614, libraries 616, frameworks/middleware layer 618, applications 620, and presentation layer 644. Operationally, the applications 620 or other components within the layers may invoke API calls 624 through the software stack and access a response, returned values, and so forth illustrated as messages 626 in response to the API calls 624. The layers illustrated are representative in nature and not all software architectures have all layers. For example, some mobile or special purpose operating systems may not provide a frameworks/middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of an interrupt and, in response, cause the software architecture 602 to pause its current processing and execute an interrupt service routine (ISR) when an interrupt is accessed.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 616 may provide a common infrastructure that may be utilized by the applications 620 or other components or layers. The libraries 616 typically provide functionality that allows other software modules to perform tasks in an easier fashion than to interface directly with the underlying operating system 614 functionality (e.g., kernel 628, services 630 or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks/middleware layer 618 may provide a higher-level common infrastructure that may be utilized by the applications 620 or other software components/modules. For example, the frameworks/middleware layer 618 may provide various graphic user interface (GUI) functions, high-level resource management, high-level location services, and so forth. The frameworks/middleware layer 618 may provide a broad spectrum of other APIs that may be utilized by the applications 620 or other software components/modules, some of which may be specific to a particular operating system or platform.

The applications 620 include built-in applications 640 or third-party applications 642. Examples of representative built-in applications 640 may include, but are not limited to, a contacts application, a browser application, a book reader application, a location application, a media application, a messaging application, or a game application. Third-party applications 642 may include any of the built-in applications as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 642 may invoke the API calls 624 provided by the mobile operating system such as operating system 614 to facilitate functionality described herein.

The applications 620 may utilize built in operating system functions (e.g., kernel 628, services 630 or drivers 632), libraries (e.g., system libraries 634, API libraries 636, and other libraries 638), and frameworks/middleware layer 618 to create user interfaces to interact with users of the system. Alternatively, or additionally, in some systems, interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware computing device. A virtual machine is hosted by a host operating system (operating system 614) and typically, although not always, has a virtual machine monitor 646, which manages the operation of the virtual machine as well as the interface with the host operating system (e.g., operating system 614). A software architecture executes within the virtual machine 648 such as an operating system 650, libraries 652, frameworks/middleware 654, applications 656 or presentation layer 658. These layers of software architecture executing within the virtual machine 648 can be the same as corresponding layers previously described or may be different.

Certain examples are described herein as including logic or a number of components, modules, or mechanisms. Modules or components may constitute either software modules/components (e.g., code embodied (1) on a non-transitory machine-readable medium or (2) in a transmission signal) or hardware-implemented modules/components. A hardware-implemented module/component is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module/component that operates to perform certain operations as described herein.

In various examples, a hardware-implemented module/component may be implemented mechanically or electronically. For example, a hardware-implemented module/component may comprise dedicated circuitry or logic that is permanently configured (e.g., as a special-purpose processor, such as a field programmable gate array (FPGA) or an application-specific integrated circuit (ASIC)) to perform certain operations. A hardware-implemented module/component may also comprise programmable logic or circuitry (e.g., as encompassed within a general-purpose processor or another programmable processor) that is temporarily configured by software to perform certain operations. It will be appreciated that the decision to implement a hardware-implemented module/component mechanically, in dedicated and permanently configured circuitry, or in temporarily configured circuitry (e.g., configured by software) may be driven by cost and time considerations.

Accordingly, the term "hardware-implemented module" or "hardware-implemented component" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules/components are temporarily configured (e.g., programmed), each of the hardware-implemented modules/components need not be configured or instantiated at any one instance in time. For example, where the hardware-implemented modules/components comprise, a general-purpose processor configured using software, the general-purpose processor may be configured as respective different hardware-implemented modules/components at different times. Software may accordingly configure a processor, for example, to constitute a particular hardware-implemented module/component at one instance of time and to constitute a different hardware-implemented module/component at a different instance of time.

Hardware-implemented modules/components can provide information to, and receive information from, other hardware-implemented modules/components. Accordingly, the described hardware-implemented modules/components may be regarded as being communicatively coupled. Where multiple of such hardware-implemented modules/components exist contemporaneously, communications may be achieved through signal transmission (e.g., over appropriate circuits and buses that connect the hardware-implemented modules/components). In examples in which multiple hardware-implemented modules/components are configured or instantiated at different times, communications between such hardware-implemented modules/components may be achieved, for example, through the storage and retrieval of information in memory structures to which the multiple hardware-implemented modules/components have access. For example, one hardware-implemented module/component may perform an operation, and store the output of that operation in a memory device to which it is communicatively coupled. A further hardware-implemented module/component may then, at a later time, access the memory device to retrieve and process the stored output. Hardware-implemented modules/components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules/components that operate to perform one or more operations or functions. The modules/components referred to herein may, in some examples, comprise processor-implemented modules/components.

Similarly, the methods described herein may be at least partially processor-implemented. For example, at least some of the operations of a method may be performed by one or more processors or processor-implemented modules/components. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (Saas)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In examples, operations may be performed by one or more programmable processors executing a computer program to perform functions by operating on input data and generating output. Method operations can also be performed by, and apparatus of some examples may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various examples.

Figure 7:
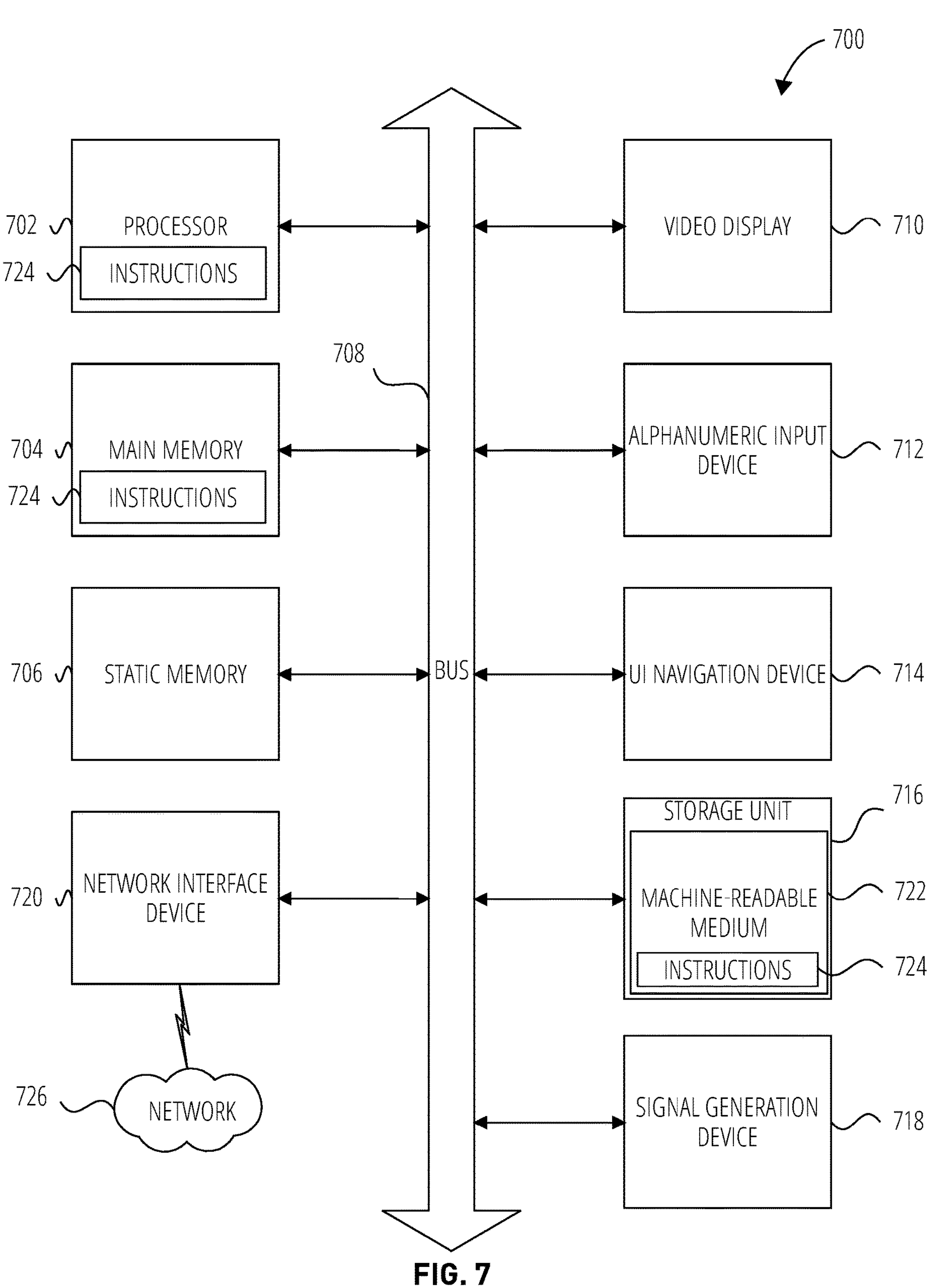
FIG. 7 is a block diagram of a machine in the form of a computer system, according to some examples, within which instructions may be executed for causing the machine to perform any one or more of the methodologies discussed herein.

FIG. 7 is a block diagram of a machine in the example form of a computer system 700 within which instructions 724 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a GPU, or both), a primary or main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a UI navigation (or cursor control) device 714 (e.g., a mouse), a storage unit 716, a signal generation device 718 (e.g., a speaker), and a network interface device 720.

The storage unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 or within the processor 702 during execution thereof by the computer system 700, with the main memory 704 and the processor 702 also each constituting a machine-readable medium 722.

While the machine-readable medium 722 is shown in accordance with some examples to be a single medium, the term "machine-readable medium" may include a single medium or multiple media (e.g., a centralized or distributed database, or associated caches and servers) that store the one or more instructions 724 or data structures. The term "machine-readable medium" shall also be taken to include any tangible medium that is capable of storing, encoding, or carrying instructions 724 for execution by the machine and that cause the machine to perform any one or more of the methodologies of the present disclosure, or that is capable of storing, encoding, or carrying data structures utilized by or associated with such instructions 724. The term "machine-readable medium" shall accordingly be taken to include, but not be limited to, solid-state memories, and optical and magnetic media. Specific examples of a machine-readable medium 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 724 may further be transmitted or received over a communications network 726 using a transmission medium. The instructions 724 may be transmitted using the network interface device 720 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 724 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

What is claimed is:

1. A system comprising:

at least one memory that stores instructions; and one or more processors configured by the instructions to execute operations comprising:

receiving, from a device agent executing on each of a plurality of user devices, resource utilization data indicating excess available resources on the user device that the user device can contribute to execute cluster workloads on the user device;

receiving a workload execution request that identifies resource requirements of a cluster workload;

dynamically configuring a cluster comprising the plurality of user devices based on the workload execution request and the resource utilization data of the plurality of user devices;

transmitting, to the device agent executing on each of the plurality of user devices, an instruction to allocate a first portion of resources from the excess available resources on the user device to the cluster to execute a respective portion of the cluster workload, and a separate second portion of resources on the user device to execute respective user workloads that differ from the cluster workload; and causing the workload execution request to be executed on the cluster, wherein each of the plurality of user devices simultaneously executes the respective user workloads of the user device in a user environment on the user device using the second portion of resources on the user device and the respective portion of the cluster workload in a separate cluster environment on the user device using the first portion of resources from the excess available resources on the user device.

2. The system of claim 1, wherein the cluster further comprises one or more dedicated compute nodes, and a respective additional portion of the cluster workload executes on each dedicated compute node.

3. The system of claim 1, wherein, for each user device, the user device is included in the cluster based on the user device meeting one or more cluster contribution criteria.

4. The system of claim 1, the operations further comprising:

adding, by a cluster controller, the plurality of user devices to the cluster from a pool of user devices.

5. The system of claim 1, wherein a cluster agent executing on the cluster aggregates the resource utilization data from the device agents of the plurality of user devices.

6. The system of claim 1, wherein the cluster environment comprises at least one of a virtual machine or a container.

7. The system of claim 1, wherein a cluster controller is communicatively coupled to the cluster and to a plurality of other clusters in a distributed computing environment.

8. The system of claim 1, the operations further comprising:

transmitting a message to each user device to indicate that the user device has been assigned to the cluster.

9. A method comprising:

receiving, from a device agent executing on each of a plurality of user devices, resource utilization data indicating excess available resources on the user device that the user device can contribute to execute cluster workloads on the user device;

receiving a workload execution request that identifies resource requirements of a cluster workload;

dynamically configuring a cluster comprising the plurality of user devices based on the workload execution request and the resource utilization data of the plurality of user devices;

transmitting, to the device agent executing on each of the plurality of user devices, an instruction to allocate a first portion of resources from the excess available resources on the user device to the cluster to execute a respective portion of the cluster workload, and a separate second portion of resources on the user device to execute respective user workloads that differ from the cluster workload; and causing the workload execution request to be executed on the cluster, wherein each of the plurality of user devices simultaneously executes the respective user workloads of the user device in a user environment on the user device using the second portion of resources on the user device and the respective portion of the cluster workload in a separate cluster environment on the user device using the first portion of resources from the excess available resources on the user device.

10. The method of claim 9, wherein the cluster further comprises one or more dedicated compute nodes, and a respective additional portion of the cluster workload executes on each dedicated compute node.

11. The method of claim 9, wherein, for each user device, the user device is included in the cluster based on the user device meeting one or more cluster contribution criteria.

12. The method of claim 9, further comprising:

transmitting a message to each user device to indicate that the user device has been assigned to the cluster.

13. The method of claim 9, wherein a cluster controller is communicatively coupled to the cluster and to a plurality of other clusters in a distributed computing environment.

14. The method of claim 9, wherein the cluster environment comprises at least one of a virtual machine or a container.

15. A non-transitory computer-readable medium that stores instructions that, when executed by one or more processors, cause the one or more processors to execute operations comprising:

receiving, from a device agent executing on each of a plurality of user devices, resource utilization data indicating excess available resources on the user device that the user device can contribute to execute cluster workloads on the user device;

receiving a workload execution request that identifies resource requirements of a cluster workload;

dynamically configuring a cluster comprising the plurality of user devices based on the workload execution request and the resource utilization data of the plurality of user devices;

transmitting, to the device agent executing on each of the plurality of user devices, an instruction to allocate a first portion of resources from the excess available resources on the user device to the cluster to execute a respective portion of the cluster workload, and a separate second portion of resources on the user device to execute respective user workloads that differ from the cluster workload; and causing the workload execution request to be executed on the cluster, wherein each of the plurality of user devices simultaneously executes the respective user workloads of the user device in a user environment on the user device using the second portion of resources on the user device and the respective portion of the cluster workload in a separate cluster environment on the user device using the first portion of resources from the excess available resources on the user device.

16. The non-transitory computer-readable medium of claim 15, wherein the cluster further comprises one or more dedicated compute nodes, and a respective additional portion of the cluster workload executes on each dedicated compute node.

17. The non-transitory computer-readable medium of claim 15, wherein, for each user device, the user device is included in the cluster based on the user device meeting one or more cluster contribution criteria.

18. The non-transitory computer-readable medium of claim 15, the operations further comprising:

transmitting a message to each user device to indicate that the user device has been assigned to the cluster.

19. The non-transitory computer-readable medium of claim 15, wherein a cluster controller is communicatively coupled to the cluster and to a plurality of other clusters in a distributed computing environment.

20. The non-transitory computer-readable medium of claim 15, wherein the cluster environment comprises at least one of a virtual machine or a container.

* * * * *